US012561959B2

(12) United States Patent
Wang et al.

(10) Patent No.:  US 12,561,959 B2
(45) Date of Patent:  Feb. 24, 2026

(54) METHOD, ELECTRONIC DEVICE, AND COMPUTER PROGRAM PRODUCT FOR TARGET IMAGE PROCESSING

(71) Applicant: Dell Products L.P., Round Rock, TX (US)

(72) Inventors: Zijia Wang, WeiFang (CN); Sanping Li, Beijing (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 606 days.

(21) Appl. No.: 17/988,484

(22) Filed: Nov. 16, 2022

(65) Prior Publication Data

US 2024/0185583 A1    Jun. 6, 2024

(30) Foreign Application Priority Data

Oct. 21, 2022    (CN) .......................... 202211295882.X

(51) Int. Cl.
*G06V 10/776*        (2022.01)
*G06V 10/762*        (2022.01)

(52) U.S. Cl.
CPC .......... *G06V 10/776* (2022.01); *G06V 10/763* (2022.01)

(58) Field of Classification Search
CPC .... G06V 10/776; G06V 10/763; G06V 10/82; G06T 2207/20076; G06T 2207/20084; G06N 3/0455
See application file for complete search history.

(56) References Cited

U.S. PATENT DOCUMENTS

| | | | |
|---|---|---|---|
| 2023/0067026 A1* | 3/2023 | Huts ...................... | G06V 20/00 |
| 2023/0368223 A1* | 11/2023 | Song .................. | G06Q 30/0202 |
| 2025/0039987 A1* | 1/2025 | Salmasi ................ | G06T 19/006 |

OTHER PUBLICATIONS

S. M. Lunberg et al., "A Unified Approach to Interpreting Model Predictions," Proceedings of the 31st International Conference on Neural Information Processing Systems, Dec. 2017, pp. 4768-4777.

(Continued)

*Primary Examiner* — Sumati Lefkowitz
*Assistant Examiner* — Michael Adam Shariff
(74) *Attorney, Agent, or Firm* — Ryan, Mason & Lewis, LLP

(57)        ABSTRACT

Embodiments disclosed herein include a method, an electronic device, and a computer program product for target image processing. The method includes receiving a target image and generating a first Shapley value for a feature of the target image based on the received target image. The method further includes sending, in response to satisfying a predetermined condition, a request for acquiring a second Shapley value to a cloud server. The method further includes receiving the second Shapley value for a latent feature of the target image from the cloud server, where the second Shapley value is more accurate than the first Shapley value. In some embodiments, through joint collaboration between a terminal device such as an edge device and a cloud server, rapid calculation of a Shapley value can be achieved at the terminal device, and accurate calculation of a Shapley value can be achieved at the cloud server.

18 Claims, 5 Drawing Sheets

(56) References Cited

OTHER PUBLICATIONS

N. Jethani et al., "Have We Learned to Explain ?: How Interpretability Methods Can Learn to Encode Predictions in their Interpretations," Proceedings of Machine Learning Research, arXiv:2103. 01890v1, Mar. 2, 2021, 15 pages.

B. Rozemberczki et al., "The Shapley Value in Machine Learning," arXiv:2202.05594v2, May 26, 2022, 8 pages.

Wikipedia, "Shapley Value," https://en.wikipedia.org/wiki/Shapley_value, Jun. 25, 2022, 8 pages.

U.S. Appl. No. 17/857,222 filed in the name of Jiacheng Ni et al. filed Jul. 5, 2022, and entitled "Method, Electronic Device, and Computer Program Product for Detecting Model Drift."

U.S. Appl. No. 17/984,728 filed in the name of Jiacheng Ni et al. filed Nov. 10, 2022, and entitled "Method, Electronic Device, and Computer Program Product for Detecting Model Performance."

* cited by examiner

Figure 3:
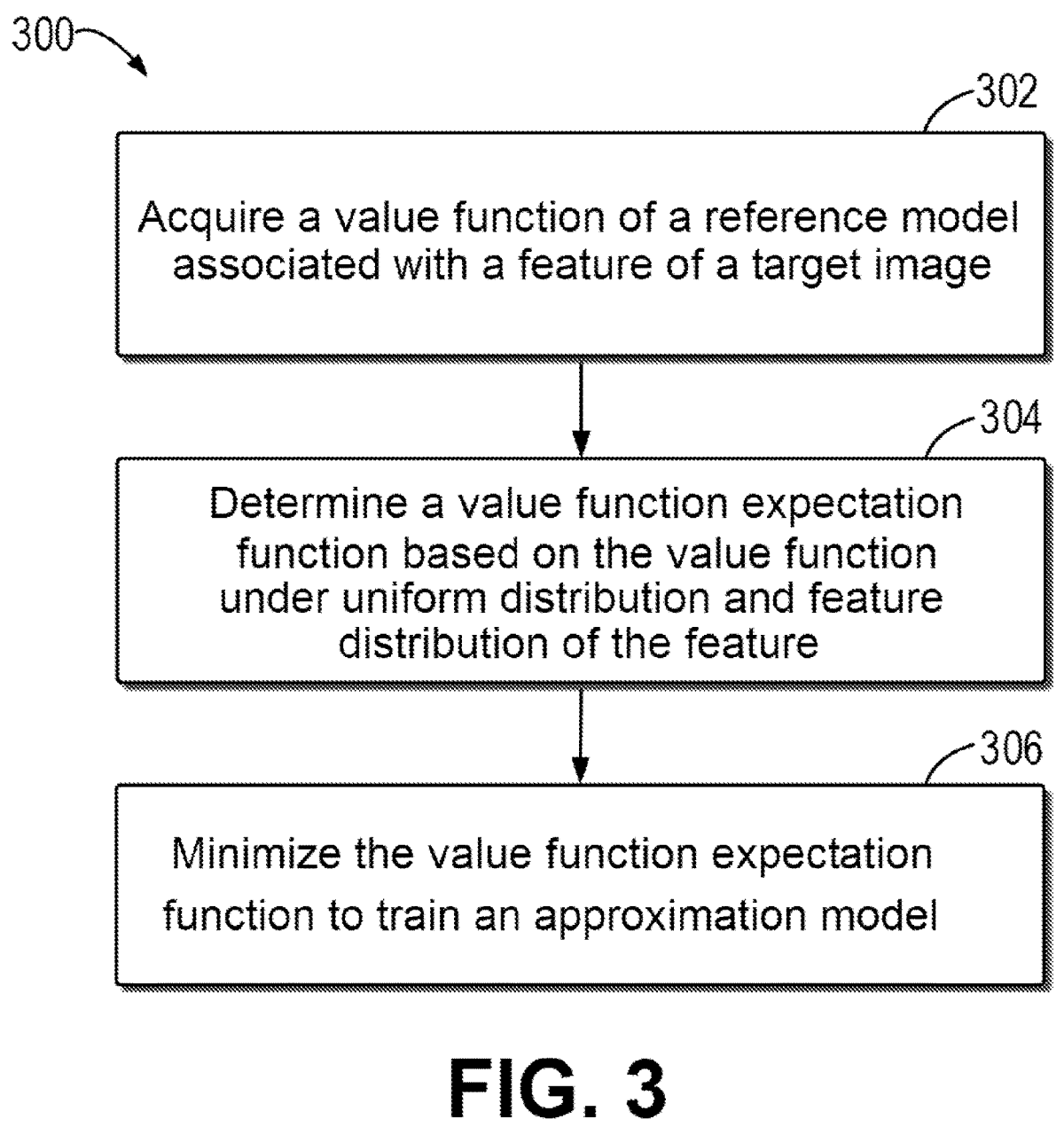

300

302

Acquire a value function of a reference model associated with a feature of a target image

304

Determine a value function expectation function based on the value function under uniform distribution and feature distribution of the feature

306

Minimize the value function expectation function to train an approximation model

Acquire a masked feature under
the feature distribution of a feature

404

Determine a distribution expectation
function based on the masked feature

406

Minimize the distribution expectation
function to train a reference model

METHOD, ELECTRONIC DEVICE, AND COMPUTER PROGRAM PRODUCT FOR TARGET IMAGE PROCESSING

RELATED APPLICATION(S)

The present application claims priority to Chinese Patent Application No. 202211295882.X, filed Oct. 21, 2022, and entitled "Method, Electronic Device, and Computer Program Product for Target Image Processing," which is incorporated by reference herein in its entirety.

FIELD

Embodiments of the present disclosure relate to the field of computers, and more particularly, to a method, an electronic device, and a computer program product for target image processing.

BACKGROUND

Unlike other software, performance of a machine learning model may deteriorate over time due to a change in an environment (such as a user behavior or a sensor drift). However, it takes more time and resources to retrain the machine learning model, so more interpretability of the machine learning model is expected. In this case, Shapley values are generally introduced and used to perform prediction of the machine learning model, and the like.

SUMMARY

Embodiments of the present disclosure provide a method, an electronic device, and a computer program product for target image processing.

According to a first aspect of the present disclosure, a method for target image processing is provided. The method includes receiving a target image and generating a first Shapley value for a feature of the target image based on the received target image. The method further includes sending, in response to satisfying a predetermined condition, a request for acquiring a second Shapley value to a cloud server. The method further includes receiving the second Shapley value for a latent feature of the target image from the cloud server, where the second Shapley value is more accurate than the first Shapley value.

According to a second aspect of the present disclosure, an electronic device is provided. The electronic device includes at least one processor; a memory coupled to the at least one processor and having instructions stored thereon, where the instructions, when executed by the at least one processor, cause the device to perform actions including: receiving a target image; generating a first Shapley value for a feature of the target image based on the received target image; sending, in response to satisfying a predetermined condition, a request for acquiring a second Shapley value to a cloud server; and receiving the second Shapley value for a latent feature of the target image from the cloud server, where the second Shapley value is more accurate than the first Shapley value.

According to a third aspect of the present disclosure, a computer program product is provided, which is tangibly stored on a non-transitory computer-readable medium and includes machine-executable instructions, where the machine-executable instructions, when executed by a machine, cause the machine to perform steps of the method in the first aspect of the present disclosure.

BRIEF DESCRIPTION OF THE DRAWINGS

By more detailed description of example embodiments of the present disclosure, provided herein with reference to the accompanying drawings, the above and other objectives, features, and advantages of the present disclosure will become more apparent, where identical reference numerals generally represent identical components in the example embodiments of the present disclosure.

FIG. 3 illustrates a flow chart of a training method for training an approximation model according to an embodiment of the present disclosure;

In the drawings, identical or corresponding numerals represent identical or corresponding parts.

DETAILED DESCRIPTION

Figure 1:
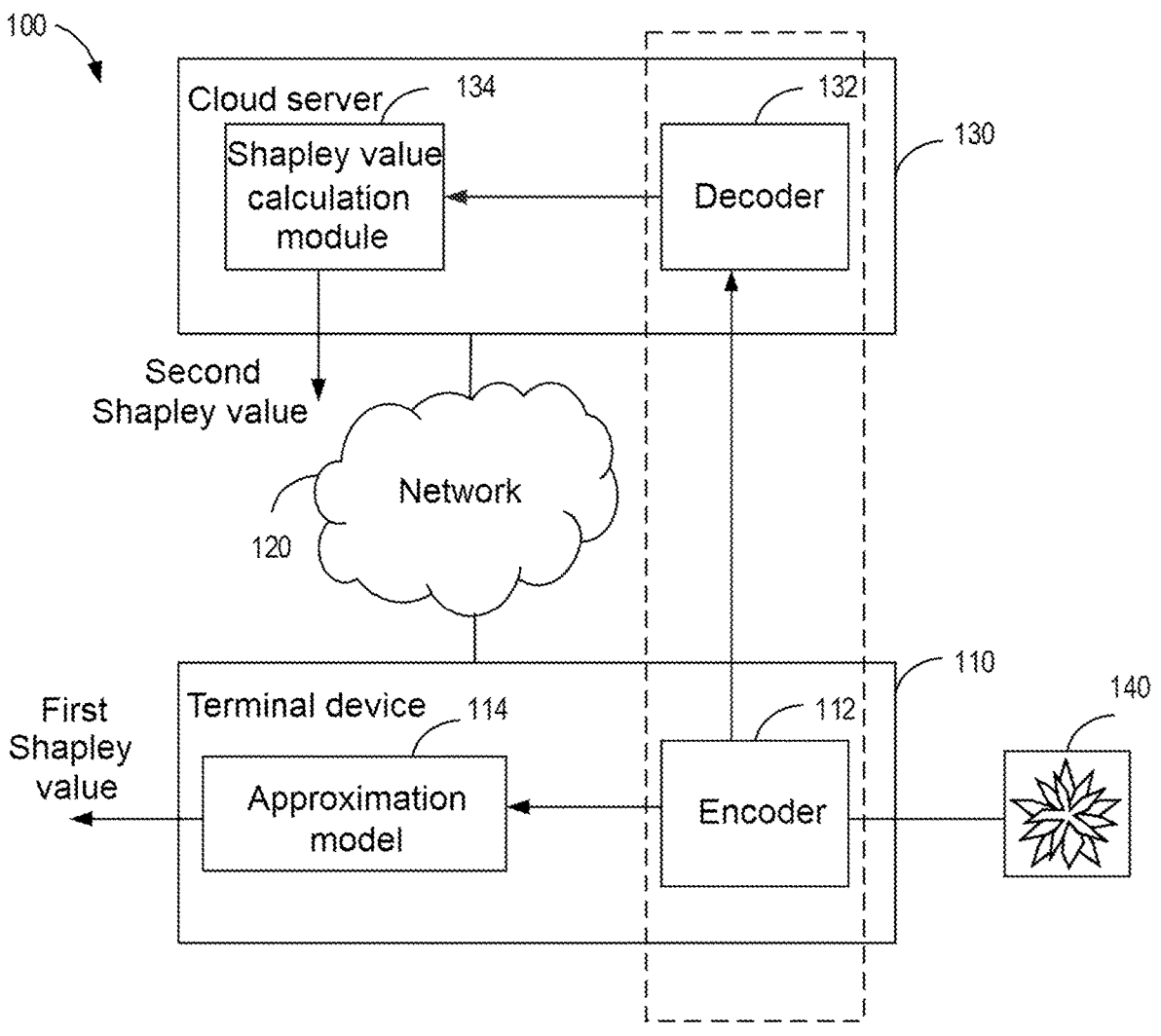
FIG. 1 illustrates a block diagram of an example system in which a device and/or a method according to embodiments of the present disclosure can be implemented.

Illustrative embodiments of the present disclosure will be described in more detail below with reference to the accompanying drawings. Although the accompanying drawings show some embodiments of the present disclosure, it should be understood that the present disclosure can be implemented in various forms, and should not be interpreted as being limited to the embodiments stated herein. Rather, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Shapley values are a popular method to measure the influence of a single feature. As described above, a Shapley value has been introduced into a machine learning model to interpret prediction of the machine learning model and the like. Shapley values come from solving the problem of contributions and profit allocation in a cooperative game. When N persons cooperate, the contributions of individual members are different, and accordingly, profit allocation is different. In an ideal allocation manner, contributions are equal to profits. A Shapley value is introduced into a machine learning model to interpret the prediction of the machine learning model, which is based on the following principle: the Shapley value of a feature should be the average marginal contribution of the feature over all feature sequences.

However, the calculation of Shapley values using current technology is very time-consuming and consumes a substantial amount of computing resources. This means that it is difficult to apply such calculations to a terminal device such as an edge device. However, terminal devices are increasingly widely used due to advantages such as easy maintenance and quick response. Therefore, the expectation is to realize the calculation of the Shapley value on terminal devices such as edge devices, so as to acquire Shapley values more quickly and provide a processing basis for subsequent processing.

To solve at least the above and other potential problems, an embodiment of the present disclosure provides a method for target image processing. The method includes receiving a target image and generating a first Shapley value for a feature of the target image based on the received target image. The method further includes sending, in response to satisfying a predetermined condition, a request for acquiring a second Shapley value to a cloud server. The method further includes receiving the second Shapley value for a latent feature of the target image from the cloud server, where the second Shapley value is more accurate than the first Shapley value. With the method for target image processing according to this embodiment of the present disclosure, through joint collaboration between the terminal device such as the edge device and the cloud server, on the one hand, rapid calculation of a Shapley value can be achieved at the terminal device, and on the other hand, accurate calculation of a Shapley value can be achieved at the cloud server, so as to provide flexible choices for different requirements. Further, in this embodiment of the present disclosure, an efficient and compact joint computing architecture is further provided by employing collaboration between the terminal device and the cloud server, which can improve the operational efficiency of the architecture and save computing resources.

Embodiments of the present disclosure will be further described in detail below in conjunction with the accompanying drawings. FIG. 1 illustrates a block diagram of a system 100 for target image processing according to some embodiments of the present disclosure. As shown in FIG. 1, system 100 may include terminal device 110 and cloud server 130, and terminal device 110 may communicate with cloud server 130 through network 120. Network 120 may be various types of networks, such as a local area network and/or a wide area network.

Terminal device 110 may include encoder 112 and approximation model 114. It may be understood that other components of terminal device 110 are not illustrated in the drawings for clarity and simplicity of illustration. In some embodiments, encoder 112 is a part of an auto-encoder (shown by the dashed box in FIG. 1). Encoder 112 may encode a received target object, for example, target image 140, to obtain an encoded feature. Encoder 112 may transmit the encoded feature to approximation model 114. In addition, encoder 112 may further transmit a latent feature in the encoded feature to decoder 132 deployed in cloud server 130, for the decoder to decode the latent feature. Encoder 112 deployed in terminal device 110 and decoder 132 deployed in cloud server 130 together constitute the auto-encoder.

In some embodiments, the auto-encoder may be obtained by training. The training of the auto-encoder may be performed through a reconstruction loss function constructed based on the difference between a reconstructed sample and an original sample. The auto-encoder is used in system 100 according to this embodiment of the present disclosure. Due to the good encoding capability and decoding capability of the auto-encoder, a closer approximation to an input original image can be achieved. It may be understood that other types of encoders and decoders may also be used in system 100 according to this embodiment of the present disclosure. Moreover, the encoder and the decoder are deployed at the terminal device and the cloud server respectively, and the encoder transmits only a latent feature of the target image to the decoder. Thus, on the one hand, the amount of data transmitted can be reduced, and communication bandwidth requirements can be reduced. On the other hand, important and key information of the target image will not be lost, and the reconstructed image after decoding will not be affected.

As shown in FIG. 1, after encoder 112 in FIG. 1 encodes target image 140, a feature of encoded target image 140 is inputted to an approximation model, and the approximation model outputs a first Shapley value for the feature of encoded target image 140. In some embodiments, the first Shapley value may be an approximate Shapley value. On the other hand, in system 100 in FIG. 1, Shapley value calculation module 134 deployed in cloud server 130 may calculate a second Shapley value based on a received latent feature. In some embodiments, since Shapley value calculation module 134 deployed in cloud server 130 may mobilize a large amount of computing resources to calculate the Shapley value, the second Shapley value may include an accurate Shapley value.

It may be understood that, when the terminal device uses the approximation model to calculate the first Shapley value, although an approximate value is obtained, due to compactness and a high operation speed, the approximation model may be suitable for a scenario where a relatively high calculation speed is required and accuracy is appropriately relaxed. On the other hand, since cloud server 130 may mobilize a large amount of computing resources to calculate the second Shapley value and can obtain an accurate Shapley value, it is suitable for a scenario where relatively high accuracy is required but processing time may be appropriately relaxed. In view of the above, the system according to this embodiment of the present disclosure provides a joint computing system in the cloud server and in the edge device, and can adapt to different use requirements to provide different Shapley values, which can thus be flexibly suitable for various scenarios and requirements and can further improve user experience.

Terminal device 110 depicted in FIG. 1 may be an electronic device in any other form. The present disclosure does not limit the type of terminal device that implements the method for target image processing according to embodiments of the present disclosure. For example, electronic devices may include, but are not limited to, a personal computer, a server computer, a handheld or laptop device, a mobile device (such as a mobile phone, a personal digital assistant (PDA), and a media player), a multi-processor system, a consumer electronic product, a wearable electronic device, an intelligent home device, a minicomputer, a mainframe computer, an edge device, various types of Internet of Things devices, a distributed computing environment including any of the above systems or devices, etc. In addition, FIG. 1 may include any number and any type of terminal devices and any form of communication networks. In other words, cloud server 130 may communicate with a plurality of terminal devices 110 through various forms of communication networks, individually or collectively denoted as network 120, receive target objects from the plurality of terminal devices 110, and transmit accurate, calculated Shapley values to a plurality of different terminal devices 110, and the like, which is not limited in the present disclosure.

Figure 2:
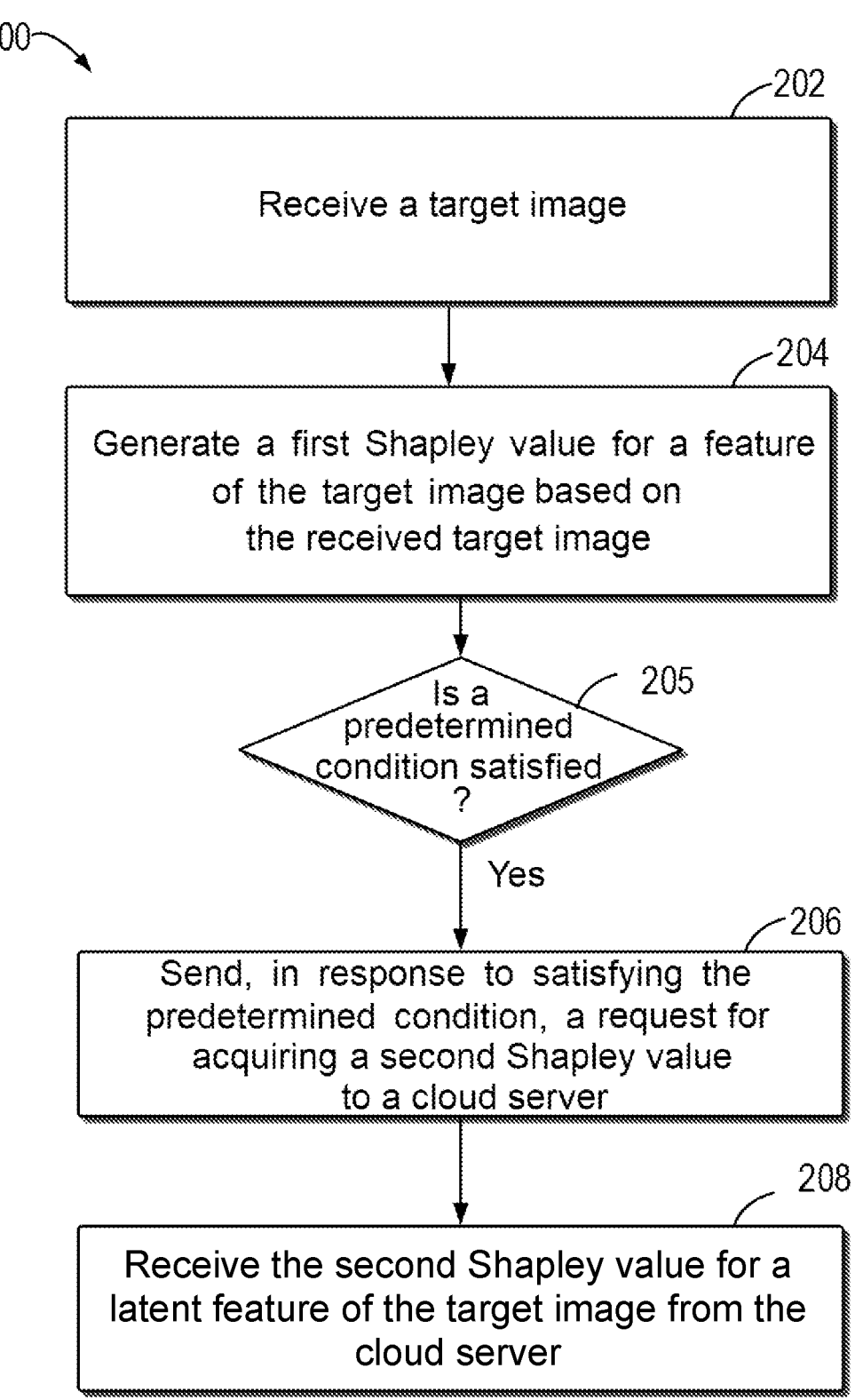
FIG. 2 illustrates a flow chart of a method for target image processing according to an embodiment of the present disclosure.

A block diagram of example system 100 in which embodiments of the present disclosure can be implemented has been described above with reference to FIG. 1. A flow chart of method 200 for target image processing according to an embodiment of the present disclosure will be described below with reference to FIG. 2. Method 200 can be implemented at terminal device 110 in FIG. 1 and at any suitable electronic device.

At block 202, terminal device 110 receives target image 140. The target image may be various types and formats of images, which is not limited in the present disclosure. In addition, terminal device 110 may receive various numbers of target images 140.

At block 204, terminal device 110 may generate a first Shapley value for a feature of target image 140 based on received target image 140. Referring to FIG. 1, terminal device 110 may use encoder 112 deployed at terminal device 110 to encode target image 140, so as to obtain the feature of target image 140. As described above, encoder 112 may be a part of an auto-encoder, and decoder 132 in the auto-encoder is deployed in cloud server 130 and may be configured to decode a latent feature from the encoder.

At block 206, terminal device 110 determines whether a predetermined condition is satisfied. The predetermined condition may include a situation where terminal device 110 needs an accurate Shapley value for accurate judgment or where approximation model 114 needs to be fine-tuned. The predetermined condition may actually include any situation where a second Shapley value needs to be acquired. Therefore, the terminal device may further set other different predetermined conditions according to use requirements to acquire the second Shapley value. This is not limited in the present disclosure.

When the predetermined condition is satisfied, at block 206, terminal device 110 may send, in response to satisfying the predetermined condition, a request for acquiring a second Shapley value to cloud server 130. As described above, the method for target image processing according to this embodiment of the present disclosure can be flexibly adapted to various requirements. For example, when an accurate Shapley value is needed, terminal device 110 may send the request for acquiring the second Shapley value to cloud server 130. In another example, when an approximation model deployed at terminal device 110 needs to be fine-tuned, the second Shapley value needs to be used. In this case, terminal device 110 may send the request for acquiring the second Shapley value to cloud server 130. The above is only an example. Terminal device 110 may send, according to a requirement, the request for acquiring the second Shapley value to cloud server 130.

At block 208, terminal device 110 may receive the second Shapley value for a latent feature of target image 140 from cloud server 130. In some embodiments, Shapley value calculation module 134 mobilizes a large amount of computing resources when calculating the second Shapley value, so that an accurate Shapley value can be obtained. In other words, the second Shapley value may be an accurate Shapley value for the latent feature in the target image. Therefore, the second Shapley value is more accurate or precise than the first Shapley value. In some embodiments, encoder 112 transmits the latent feature in the feature of target image 140 to decoder 132, so that decoder 132 decodes the received latent feature. According to the decoded Shapley value, Shapley value calculation module 134 may calculate the second Shapley value for the latent feature of target image 140 and send the calculated second Shapley value to terminal device 110 in response to the request for acquiring the second Shapley value. A calculation principle for the second Shapley value will be described in the following.

In some embodiments, terminal device 110 may understand the interpretability of each pixel in target image 140, so as to provide support for subsequent processing. In addition, terminal device 110 may further fine-tune approximation model 114 based on the first Shapley value and the second Shapley value, so as to obtain a more accurate approximation.

A method for target image processing according to an embodiment of the present disclosure has been described above with reference to FIG. 2. With the method for target image processing according to this embodiment of the present disclosure, through joint collaboration between a terminal device such as an edge device and a cloud server, on the one hand, rapid calculation of a Shapley value can be achieved at the terminal device, and on the other hand, accurate calculation of a Shapley value can be achieved at the cloud server, so as to provide flexible choices for different requirements. Further, in this embodiment of the present disclosure, an efficient and compact joint computing architecture can be further provided by employing collaboration between the terminal device and the cloud server, which can improve the operational efficiency of the architecture and save computing resources.

In some embodiments, approximation model 114 deployed in terminal device 110 is trained based on a uniform distribution and a feature distribution of the feature. A training process of approximation model 114 will be described in detail below with reference to FIG. 3. FIG. 3 illustrates a flow chart of training method 300 for an approximation model according to an embodiment of the present disclosure. Training method 300 can be implemented at terminal device 110 in FIG. 1 and at any suitable electronic device.

At block 302, terminal device 110 may acquire a value function of a reference model associated with a feature of target image 140. In some embodiments, reference model β may support a situation where at least part of the feature of the inputted target image is masked. In other words, masked input feature m(x, s) may be defined. Masked input feature m(x, s) represents an input feature after mask function m performs a mask operation on one or more features $x_i$ in feature X={$x_1$, $x_2$ . . . $x_k$}. In reference model β, the distribution probability of the masked feature is consistent with the probability distribution of the original feature (that is, a feature not masked) corresponding to the masked feature under a predefined original model. In some embodiments, reference model β receives the feature of the target image and outputs probability distribution with respect to a true value according to the feature of the target image.

After obtaining reference model β, terminal device 110 may calculate a value function of reference model β based on the probability distribution of reference model β. The value function of reference model β may be acquired based on Equation (1):

$$v_{x,y}(s) = \text{link}\left( \mathbb{E}\left[ \frac{p_{surr}\ (y|m(x, s); \beta^*)}{p(x)p(s)} \right] \right) \qquad (1)$$

7 where $p_{surr}$ denotes a surrogate model or value function approximator.

At block 304, terminal device 110 may determine a value function expectation function based on the value function under the uniform distribution and the feature distribution of the feature (that is, the feature of the target image). In some embodiments, terminal device 110 may construct the value function expectation function according to Equation (2).

$$F = \mathop{\mathbb{E}}_{p(x)Unif(y)p(s)}\left[(v_{x,y}(s) - v_{x,y}(0) - s^{\top}\phi_{fast}(x, y; \theta))^2\right] \quad (2)$$

Here, $p(x)$ denotes the distribution of the feature of the target image, $Unif(y)$ denotes uniform distribution, $p(s)$ denotes the distribution of a subset of features of the target image, $v_{x,y}$ denotes the value function of reference model $\beta$ calculated according to Equation (1), and $\phi_{fast}(\cdot)$ denotes the first Shapley value outputted by approximation model 114. Moreover $v_{x,y}(s) - v_{x,y}(0)$ denotes the influence of the subset of features on the prediction of reference model $\beta$.

At block 306, terminal device 110 may minimize the value function expectation function to train approximation model 114. As shown by the above Equation (2), value function expectation function F may be determined according to the value function, and further, expectation function F may be used as loss function $\mathcal{L}(\theta)$, as shown in Equation (3) below, so as to minimize loss function $\mathcal{L}(\theta)$ to train approximation model 114, illustratively resulting in a trained approximation model, also referred to herein as trained approximation model $\theta$.

$$\mathcal{L}(\theta) = \mathop{\mathbb{E}}_{p(x)Unif(y)p(s)}\left[(v_{x,y}(s) - v_{x,y}(0) - s^{\top}\phi_{fast}(x, y; \theta))^2\right] \quad (3)$$

In some embodiments, terminal device 110 minimizes the loss function in the above Equation (3) to train approximation model 114, and obtains trained approximation model $\theta$. In some embodiments, trained approximation model $\theta$ may generate a Shapley value for the feature according to the received feature of target image 140, and in some embodiments, trained approximation model $\theta$ performs calculation in units of subset s when calculating the Shapley value. Therefore, the Shapley value generated by approximation model 114 is an approximate Shapley value. Moreover, since the calculation is performed in units of subset s, approximation model 114 can quickly generate the approximate Shapley value, which can meet a situation where a relatively high calculation speed is required.

Figure 4:
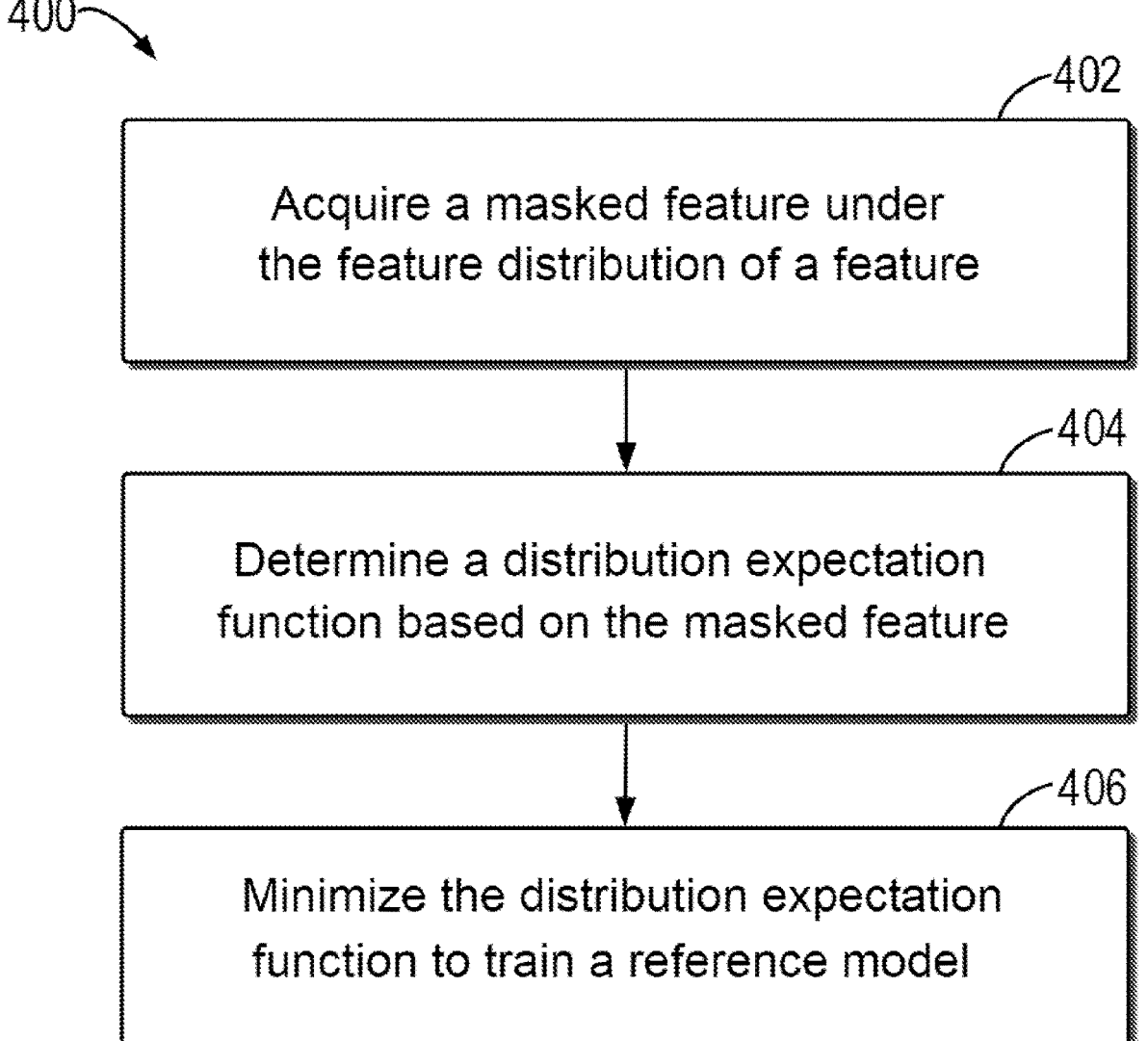
FIG. 4 illustrates a flow chart of a training method for training a reference model according to an embodiment of the present disclosure.

In some embodiments, the terminal device may further obtain trained reference model $\beta$ by training. A training process of reference model $\beta$ will be described in detail below with reference to FIG. 4. FIG. 4 illustrates a flow chart of training method 400 for reference model $\beta$ according to an embodiment of the present disclosure. Training method 400 can be implemented at terminal device 110 in FIG. 1 and at any suitable electronic device.

At block 402, terminal device 110 acquires a masked feature under the feature distribution of the feature. In some embodiments, terminal device 110 acquires the masked feature under the distribution of the feature of target image 140. In some embodiments, reference model $\beta$ may support a situation where at least part of the feature of the inputted target image is masked. In other words, masked input feature m(x, s) may be defined. Masked feature m(x, s) represents a feature after mask function m performs a mask operation on one or more features $x_i$ in feature $X = \{x_1, x_2 \ldots x_k\}$.

At block 404, terminal device 110 may determine distribution expectation function E based on masked feature m(x, s). In some embodiments, the terminal device may determine distribution expectation function E based on the following Equation (4):

$$E = \mathop{\mathbb{E}}_{p(x)p(s)}\mathbb{E}\left[D_{KL}\big(f(x; \eta)\|\{p_{surr}\big(y|m(x, s); \beta\big)\}\big)\right] \quad (4)$$

At block 406, terminal device 110 may minimize distribution expectation function E to train the reference model. In some embodiments, terminal device 110 may use expectation function E in Equation (4) as loss function $\mathcal{L}(\beta)$, as shown in Equation (5), so as to minimize loss function $L(\beta)$ to train reference model $\beta$:

$$\mathcal{L}(\beta) = \mathop{\mathbb{E}}_{p(x)p(s)}\mathbb{E}\left[D_{KL}\big(f(x; \eta)\|\{p_{surr}\big(y|m(x, s); \beta\big)\}\big)\right] \quad (5)$$

A flow chart of training method 400 for reference model $\beta$ according to an embodiment of the present disclosure has been illustrated above with reference to FIG. 4. It may be understood that the above training method is presented by way of illustrative example only. Persons skilled in the art may adjust the loss function appropriately according to model accuracy requirements and the training time, so as to realize the training of reference model $\beta$.

Referring now to FIG. 1, Shapley value calculation module 134 in the cloud server 130 in FIG. 1 may calculate a second Shapley value through the following Equation (6):

$$\phi_i(v) = \frac{1}{d}\sum_{s_i \neq 1}\binom{d-1}{1^{\top}s}^{-1}(v(s + e_i) - v(s)) \quad (6)$$

Here, $v$ denotes a value function of prediction model $\eta$ constructed with feature vector X as input and a true value as Y, and $\mu(s + e_i) - \mu(s)$ denotes the influence of each feature (for example, pixel) in an image on the prediction of the model. Taking the present disclosure as an example, $\mu(s + e_i) - \mu(s)$ may denote the influence of each pixel in an image reconstructed by decoder 132 based on the latent feature on the prediction of the model. Also, d denotes the number of features in the feature vector.

In some embodiments, the terminal device may calculate value function $\mu$ through the following Equation (7):

$$v_{x,y}(s) = \text{link}\left(\mathop{\mathbb{E}}_{p(x_{1-s})}\left[f_y(x_s, x_{1-s}; \eta)\right]\right) \quad (7)$$

Here, $\text{link}(\alpha)$ denotes a fully connected operation on parameter $\alpha$, and $f(\gamma; \eta)$ denotes the probability distribution of prediction model n in a case where the input is $\gamma$. Thus, value function $\mu$ can be calculated through Equation (7).

In conjunction with Equation (6) and Equation (7), Shapley value calculation module 134 can calculate the second Shapley value. Since Shapley value calculation module 134 performs calculation in units of features when calculating the second Shapley value and the granularity is finer, the second Shapley value calculated by Shapley value calculation module 134 is an accurate Shapley value for the latent feature of the target image. Therefore, it may be adapted to a situation where higher accuracy and precision of the Shapley value are required.

In addition, in some other embodiments, terminal device 110 may further calculate the second Shapley value through the following Equation (8):

$$\phi(v_{x,y}) = \arg\min_{\phi_{x,y}} \mathbb{E}_{p(s)} \left[ \left( v_{x,y}(s) - v_{x,y}(0) - s^T \phi_{x,y} \right)^2 \right] \qquad (8)$$

Here, μ denotes the value function of prediction model n constructed with feature vector X as input and a true value as Y, and may be calculated through the above Equation (7). Predetermined distribution probability p(s) may be defined for s (a subset of features), so that $0 < 1^T s < d$, where d denotes the number of features in the feature vector.

With the method for target image processing according to this embodiment of the present disclosure, through joint collaboration between a terminal device such as an edge device and a cloud server, on the one hand, rapid calculation of a Shapley value can be achieved at the terminal device, and on the other hand, accurate calculation of a Shapley value can be achieved at the cloud server, so as to provide flexible choices for different requirements. Further, in this embodiment of the present disclosure, an efficient and compact joint computing architecture can be further provided by employing collaboration between the terminal device and the cloud server, which can improve the operational efficiency of the architecture and save computing resources. Based on the method for target image processing in this embodiment of the present disclosure, a feature is encoded at the terminal device, and a latent feature in the feature is transmitted to the decoder in the cloud server, which can significantly reduce the amount of data transmitted and save communication bandwidth, without losing important and key information of the target image and affecting the reconstructed image after decoding.

Figure 5:
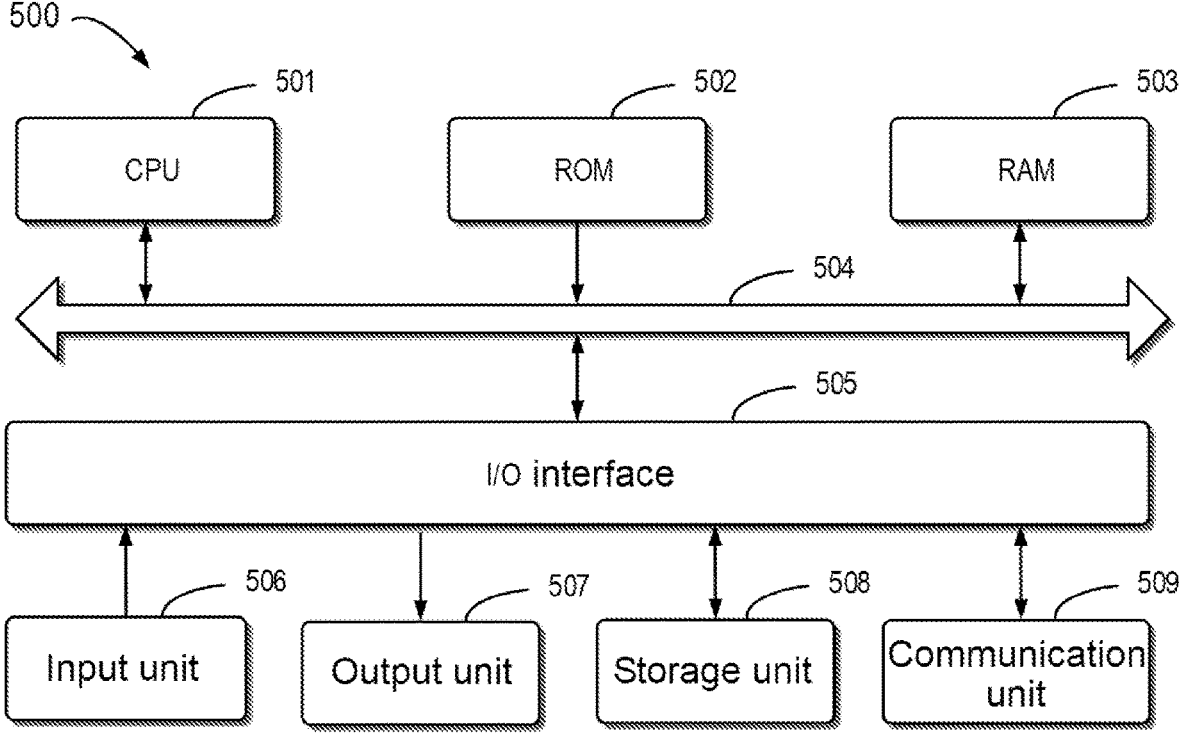
FIG. 5 illustrates a block diagram of an example device suitable for implementing embodiments of contents of the present disclosure according to an embodiment of the present disclosure.

FIG. 5 is a block diagram of example device 500 that can be used to implement an embodiment of the present disclosure. Terminal device 110 and/or cloud server 130 in FIG. 1 can be implemented using device 500. As shown in the figure, device 500 includes central processing unit (CPU) 501, which may execute various appropriate actions and processing in accordance with computer program instructions stored in read-only memory (ROM) 502 or computer program instructions loaded from storage unit 508 onto random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange input/data with other devices via a computer network, such as the Internet, and/or various telecommunication networks.

CPU 501 may perform the various processes and processing described above, such as method 200 for target image processing, training method 300, and training method

400. For example, in some embodiments, method 200 for target image processing, training method 300, and training method 400 may be implemented as a computer software program that is tangibly included in a machine-readable medium, such as storage unit 508. In some embodiments, part of or all the computer program may be loaded and/or installed to device 500 via ROM 502 and/or communication unit 509. One or more actions of method 200 for target image processing, training method 300, and training method 400 described above may be performed when the computer program is loaded into RAM 503 and executed by CPU 501.

Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or a plurality of programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status input of the computer-readable program instructions. The electronic circuit may execute the computer-readable program instructions so as to implement various aspects of the present disclosure.

Various aspects of the present disclosure are described herein with reference to flow charts and/or block diagrams of the method, the apparatus (system), and the computer program product according to embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or a plurality of blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or a plurality of blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or a plurality of blocks in the flow charts and/or block diagrams.

The flowcharts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or a plurality of executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on the involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the embodiments disclosed herein.

What is claimed is:

1. A method, comprising:
    receiving a target image;
    generating a first Shapley value for a feature of the target image based on the received target image;
    sending, in response to satisfying a predetermined condition, a request for acquiring a second Shapley value to a cloud server; and
    receiving the second Shapley value for a latent feature of the target image from the cloud server;
    wherein the second Shapley value is more accurate than the first Shapley value;
    wherein the first Shapley value is generated by an approximation model; and
    wherein the approximation model is trained based on a uniform distribution and a feature distribution of the feature.

2. The method according to claim 1, further comprising:
    encoding the target image by using an encoder, to acquire the feature of the target image;
    acquiring the latent feature in the feature; and
    sending the latent feature to the cloud server, so that the cloud server generates the second Shapley value based on the latent feature.

3. The method according to claim 2, wherein the encoder is a part of an auto-encoder, and the auto-encoder further comprises a decoder deployed in the cloud server.

4. The method according to claim 1, wherein the method further comprises:
    fine-tuning the approximation model based on the first Shapley value and the second Shapley value.

5. The method according to claim 1, wherein the method further comprises:
    training the approximation model at least in part by:
    acquiring a value function of a reference model associated with the feature;
    determining a value function expectation function based on the value function under the uniform distribution and the feature distribution of the feature; and
    minimizing the value function expectation function to train the approximation model.

6. The method according to claim 5, wherein the reference model receives the feature and outputs probability distribution with respect to a true value according to the feature.

7. The method according to claim 5, further comprising:
    training the reference model at least in part by:
    acquiring a masked feature under the feature distribution of the feature;

determining a distribution expectation function based on the masked feature; and minimizing the distribution expectation function to train the reference model.

8. An electronic device, comprising:

at least one processor; and at least one memory coupled to the at least one processor and having instructions stored therein, wherein the instructions, when executed by the at least one processor, cause the electronic device to perform actions comprising:

receiving a target image;

generating a first Shapley value for a feature of the target image based on the received target image;

sending, in response to satisfying a predetermined condition, a request for acquiring a second Shapley value to a cloud server; and receiving the second Shapley value for a latent feature of the target image from the cloud server;

wherein the second Shapley value is more accurate than the first Shapley value;

wherein the first Shapley value is generated by an approximation model; and wherein the approximation model is trained based on a uniform distribution and a feature distribution of the feature.

9. The electronic device according to claim 8, wherein the instructions, when executed by the at least one processor, further cause the electronic device to perform:

encoding the target image by using an encoder, to acquire the feature of the target image;

acquiring the latent feature in the feature; and sending the latent feature to the cloud server, so that the cloud server generates the second Shapley value based on the latent feature.

10. The electronic device according to claim 9, wherein the encoder is a part of an auto-encoder, and the auto-encoder further comprises a decoder deployed in the cloud server.

11. The electronic device according to claim 8, wherein the instructions, when executed by the at least one processor, further cause the electronic device to perform:

fine-tuning the approximation model based on the first Shapley value and the second Shapley value.

12. The electronic device according to claim 8, wherein the instructions, when executed by the at least one processor, further cause the electronic device to train the approximation model at least in part by:

acquiring a value function of a reference model associated with the feature;

determining a value function expectation function based on the value function under the uniform distribution and the feature distribution of the feature; and minimizing the value function expectation function to train the approximation model.

13. The electronic device according to claim 12, wherein the reference model receives the feature and outputs probability distribution with respect to a true value according to the feature.

14. The electronic device according to claim 12, wherein the instructions, when executed by the at least one processor, further cause the electronic device to train the reference model at least in part by:

acquiring a masked feature under the feature distribution of the feature;

determining a distribution expectation function based on the masked feature; and minimizing the distribution expectation function to train the reference model.

15. A computer program product comprising a non-transitory computer-readable medium storing machine-executable instructions that, when executed by a machine, cause the machine to perform actions comprising:

receiving a target image;

generating a first Shapley value for a feature of the target image based on the received target image;

sending, in response to satisfying a predetermined condition, a request for acquiring a second Shapley value to a cloud server; and receiving the second Shapley value for a latent feature of the target image from the cloud server;

wherein the second Shapley value is more accurate than the first Shapley value;

wherein the first Shapley value is generated by an approximation model; and wherein the approximation model is trained based on a uniform distribution and a feature distribution of the feature.

16. The computer program product according to claim 15, wherein the machine-executable instructions, when executed, further cause the machine to perform actions comprising:

encoding the target image by using an encoder, to acquire the feature of the target image;

acquiring the latent feature in the feature; and sending the latent feature to the cloud server, so that the cloud server generates the second Shapley value based on the latent feature.

17. The computer program product according to claim 16, wherein the encoder is a part of an auto-encoder, and the auto-encoder further comprises a decoder deployed in the cloud server.

18. The computer program product according to claim 16, wherein the machine-executable instructions, when executed, further cause the machine to perform an action comprising:

fine-tuning the approximation model based on the first Shapley value and the second Shapley value.

* * * * *